United States Patent Office 3,408,208
Patented Oct. 29, 1968

3,408,208
DEHYDRO-FREEZING OF MIXED INGREDIENTS OF FOODS TO PREDETERMINED DEGREES
Frank G. Lamb, Lake Oswego, Oreg., assignor to Lamb-Weston, Inc., Weston, Oreg., a corporation of Oregon
No Drawing. Continuation-in-part of application Ser. No. 195,948, May 18, 1962. This application July 31, 1964, Ser. No. 386,753
13 Claims. (Cl. 99—199)

ABSTRACT OF THE DISCLOSURE

A method of producing a readily reconstitutable dehydrofrozen food mixture wherein each ingredient is separately precooked and dehydrated to the optimum point of moisture removal of each ingredient and then frozen. The several frozen ingredients are then mixed together and subsequently reconstituted.

---

This invention relates to the dehydro-freezing of food products, i.e., the partial dehydration of a given fruit, vegetable or meat and the subsequent freezing of same, after such dehydration, as a method of preservation for storage and shipment purposes. More particularly, the inventive concept revolves about this main theme: that an ideal dehydro-frozen mixed vegetable product is one wherein each ingredient of the mixture is separately dehydrated to its optimum level before admixture, and then either separately frozen and intermixed, or mixed at such dehydrated levels and then frozen.

This application is a continuation-in-part of my application Ser. No. 195,948, filed May 18, 1962, now abandoned.

Present day mixtures of dehydrated or dehydro-frozen foods, such as soups, where there are a number of different vegetable products in the mixture, contain individual components thereof which are not dried to optimum levels, e.g., which are dried to exactly the same percent, in which case certain of such ingredients are not so dehydrated to that degree which will permit full reconstitution. In other words, in a soup containing peas, carrots, parsley, meat, etc., dehydration is accomplished to the same degree with respect to each of these and without regard to dehydration to that extent which will permit full reconstitution as to any one of the ingredients.

Reconstitution of course depends upon the amount of dehydration accomplished—if it be too great, i.e., too little moisture retained in the given product, then such product will not fully reconstitute to its original flavor, texture, etc. Conversely, if insufficiently dried, the process has not achieved one of its underlying purposes: volume and weight reduction consistent with reconstitutive ability.

In the instant invention, the underlying concept is thus as stated: each ingredient of the mixture is dehydrated by the method hereinafter described to that optimum point of moisture removal, and not less than that moisture content which will prevent full and complete reconstitution. The individual product is then frozen. The several frozen ingredients are then mixed together and sold, for example, as a dehydro-frozen product comprised of mixed vegetables, all individually dehydrated to optimum extent. The result is to achieve a taste and flavor which equals or more nearly approximates the taste of the soup as would be obtained were each of the vegetables combined as fresh vegetables.

The instant invention is propounded as eliminating the many disadvantages inherent in freezing procedures heretofore known, since the process here provided for eliminates, or substantially eliminates, damage to the cellular structures of the product as well as obvious damage to the pectin lattice work of the product, during the freezing period.

In the past, there has been no one formula for best preserving all foodstuffs by any one given method. Each foodstuff usually requires a specific treatment adapted to the peculiarity of that foodstuff. Generally speaking, very few foodstuffs are best when fully dehydrated, nor are they best when merely frozen by conventional methods. With respect to the instant invention it is contemplated that preservation approaches perfection when the given foodstuff is partly dehydrated and then frozen, with dehydration comprising retention in the product of only that amount of moisture which is sufficient to permit of full reconstitution of the product.

As an example, fresh peas can be dehydrated down to a 50% moisture retention level. If then frozen, the resultant product is indistinguishable from the fresh if the dehydro-freezing process has been carefully accomplished. However, if moisture reduction exceeds such 50% moisture retention level, i.e., goes appreciably above 50%, then it has been found that such product (here fresh peas) will not then properly reconstitute. The result is loss of taste and other of the inherent qualities of the product when fresh. On the other hand, potatoes can be dehydrated in mashed form down to about a 12% level of remaining moisture without damage thereto insofar as reconstitution be concerned. Such dehydrated mashed potatoes will fully reconstitute and will be indistinguishable from the mashed potatoes made from fresh potatoes.

Again, in the case of diced or sliced potatoes, it appears, through my experimentation, that the optimum level of weight reduction is about 35% remaining moisture content, meaning that out of 100 pounds of diced potatoes there will be about 20 pounds of solids and 15 pounds of moisture left. In this instance, such diced potatoes, reduced to this weight reduction level by proper dehydro-freeze techniques, will properly reconstitute and be indistinguishable from fresh, diced, cooked potatoes. Hence, even with respect to this one product (potatoes) the particular form in which same is marketed will primarily dictate the degree of dehydration to which the product may be subjected without interfering with the ultimate and primary objective: full and complete reconstitution.

Other examples may be given: carrots have an optimum level of dehydration of about 35% moisture remaining in the product. If appreciably more than this amount of moisture is removed, carrots do not completely reconstitute, with resultant taste and quality impairment. In the case of certain green, leafy vegetables that are used in some formulas as, e.g., vegetable soup, the dehydration can be carried down to a very low remaining moisture level and still have a very satisfactory end product for the soup. As an example, dried parsley can have only about 5% remaining moisture in the dried product and still be quite satisfactory as a garnish for a dehydro-frozen soup. Meats are subject to dehydration of various degrees; the optimum reduction level will not be constant for all types of meat and all end use purposes of the meat product. In summary, there is a varying degree of weight reduction that is optimum for different purposes and for different raw products.

Hence the underlying and novel consideration of the instant invention: to improve the taste and other inherent qualities of a dehydro-frozen food containing more than one vegetable or meat ingredient by accomplishing dehydration only down to that extent in each instance which will permit a full reconstitution of the given ingredient, and subsequently mixing the various dehydro-frozen food products for distribution as a mixed food such as found in soups, etc. the invention thus contemplates a mixed food product wherein a fresh vegetable such as peas can be dehydro-frozen at one level of weight reduction, carrots at another level, meats at a different level and other various products at still different moisture retention levels into a dehydro-frozen package for use as a stew, or a different combination of ingredients for use as a soup, etc.

In accordance with the instant invention these various ingredients, as well as others not herein specifically named, are combined after subjection to various degrees of weight reduction, preferably by a vacuum dehydro-freeze procedure. Each component thus reconstitutes to a miximum degree, with return of its original flavor upon reconstitution.

Previous methods do not attain the same results. Prepared products for home consumption such as meats, stews, spaghetti and meat balls, and other similar dishes, are now prepared for the housewife and institutional consumer in several different fashions, all of which have built into them their own perculiar disadvantage. For example, canned soups, when prepared for consumption, result in a product wherein all the ingredients taste much the same, e.g. carrots, peas and tomatoes often approach the taste only of the spices that uniformly permeate the mass.

Known dehydrated soups, stews, etc., have another primary disadvantage: a great many of the vegetable and other ingredients thereof cannot withstand the abuse of being dehydrated to a low enough moisture level so that the product will keep without spoiling in dehydrated form. Certain methods recommend chopping the ingredients to a fine consistency as a step in the dehydration procedure, but such variation is seemingly of little effect. Such ingredients still will not reconstitute properly. They also may exhibit a tough and unnatural taste.

The common form of frozen soups, stews, mixed vegetables, etc., also exhibit a further very real disadvantage: without dehydration, these prepared products contain so much liquid that they often freeze block-solid. The result is that in many cases defrosting thereof cannot be quickly and uniformly done. Frequently more heat is required to penetrate the inside of such a frozen mass than the outside, requiring excessive time. The practical and commercial disadvantage of this type of frozen product is that by its very nature it may contain in excess of 90% of moisture by weight, thus creating a shipping and packaging expense problem. Dehydro-frozen food products, on the other hand, are materially reduced in weight because of substantial moisture reduction with consequent reduction in handling expense. Also as here contemplated, when the separate ingredients are separately dehpdrofrozen and then mixed, the possibility of freezing the product into a solid block is removed.

It is accordingly a primary objective of this invention to provide a dehydro-freezing process for mixed food products wherein each one of the ingredients is dehydrated to only that percentage of moisture retention which will permit its full reconstitution, thereby retaining, upon reconstitution, all the inherent taste and appearance qualities of the several products when fresh.

It is a further object of the invention to provide a process which is ideally suited for the manufacture of mixed foods such as soups wherein each ingredient is partially dried and separately frozen, then mixed with the other frozen ingredients which also have been dehydrated to an optimum extent, the result being to preclude freezing of the package into a solid block. An additional result is to substantially and materially reduce the size and weight of the product. In this respect handling, packaging and shipping charges are materially reduced. Further, when packaged in accordance with this invention (individual ingredient separately processed and frozen) the several products are discrete, and are easily thawed for full reconstitution prior to consumption.

It is another object of the invention to provide a process for the preparation of such a food product containing mixed ingredients wherein various methods of preparation thereof may be found suitable. For example, each one of the ingredients may be dehydrated by air drying down to the extent predetermined to be optimum for that particular food product and then frozen in any conventional manner. Alternatively, each of the ingredients may be dehydrofrozen over one or more cycles, the very nature of this vacuum procedure removing a predetermined amount of moisture depending upon the amount of dehydration required, with final vacuum treatment of the product being such as to leave the same in its final state—dehydrated and frozen. Again, and optionally, a combination of both dehydro-freezing stages with alternate steps of air drying may be utilized to attain the partially dehydrated products.

Other advantages and benefits flowing from this invention will be appreciated from the further description of same which follows.

Referring to the manner of preparation of the ultimate product and as indicated above, various methods may be employed. A preferred method is disclosed in my copending application, Ser. No. 180,797, application filed Mar. 19, 1962, "Alternate Vacuum Freeze and Heat Dehydration of Food Products," now Patent No. 3,218,725.

Here this underlying idea is set forth: utilizing the full benefit of the latent heat of vaporization and the heat of fusion, during a dehydro-vacuum procedure, to obtain maximum dehydration in a minimum amount of time and with final freezing of the product through the use of vacuum, if this be desired, Dehydration in this instance may also be supplemented by withdrawal of the product from the vacuum zone after each freezing stage and subjecting said product to air dehydration of any known type. Also, by the use of this series of steps maximum preservation of the product is obtained. Such is achieved by the concept there explained—that rapid freezing of any given product by the imposition of low temperature, either induced by vacuum or otherwise, results in damage to the cellular formation of the product. This is caused by rapid or flash freezing when insufficient moisture has been removed prior to freezing, the consequence being that upon freezing expansion of the formed ice ruptures the cell walls of the product. Such damage has a natural effect of substantially altering the taste and other inherent and natural qualities of the product when reconstituted.

It is also believed that the reason almost any kind of food product, as vegetables, fruits, meats, etc., have a tendency to "bleed" after thawing is not only because some or a substantial portion of the cells thereof have been damaged by the freezing process, but also because the pectin cross-linkage structure which holds the cells together has also been ruptured. In its normal state, the pectin cross-linkage structure holds water in between the cells, very probably as "bound" water, much as a silicate gel or calcium chloride attracts and holds water without chemical action. Consequently, when such lattice work of pectin is ruptured, the water is not "bound" and therefore bleeds.

It has been found that such cellular damage, and damage to the pectin lattice, can be prevented if the temperature of the product is first lowered by vacuum to the freeze point and maintained at the freeze point or just above the same, without freezing, for an appreciable period of time before final freezing by application of even lower pressure (or other means) to lower the temperature to well below freezing. The effect of this is, inter alia, to permit gradual withdrawal of some of the water deposited exteriorly to the individual cells, with the result that, with further lowering of temperature and freezing of the moisture within the cells, expansion thereof is permitted without cellular damage. Room for expansion of the ice in the pectin lattice work is also provided. The overall effect is to retain the basic cellular structure of the product, and hence, upon thawing, retention of the cellular formation in its original state. Taste and quality are thus fully retained, or at least retained to an extent heretofore unobtainable. In the foregoing, when reference is made to pectin lattice work, what is meant is the pectin cross-linkage structure in addition to the related lignin and cellulose molecules. Vegetables are different in their structure in certain respects from, for example, the cellular structure of meats. However, in all instances, and speaking of various types of food products, there is transmission through the cell wall membrane which, if by osmotic action, or other type of penetration, requires some time. The instant procedures provide for that requisite period of time with the end result of attaining a product which, when thawed, exhibits its original cellular form.

As explained in the referred to Pat. No. 3,218,725, a prevacuum dehydration step is employed wherein the product is held at a point just above freezing for a predetermined period of time which will enable removal of that amount of moisture (preferably about 10%) that will create space for ice expansion. In said disclosure, vacuum imposition is in the order of about 4.6 mm. of mercury pressure and under such circumstances most food products, and with little deviation from this figure, will be reduced in temperature to just above the freeze point of about 32° and remain there during the required dehydration time. Following this vacuum dehydration, and on lowering the vacuum, complete freezing occurs with the result that the space formerly occupied by the removed moisture is available for expansion of the ice formed during freezing of the water or juice solution in the product.

An improved and alternate procedure requires "holding" the product at about 4.6 mm. pressure for sufficient time for all the cells within the product to "boil off" water to approximately the desired moisture level at which time the pressure may be raised to from 20 to 100 mm. of mercury for a period of time sufficient to reach an equilibrium between the cellular and intercellular structure of the food product. The water within the cell that is being boiled off will vaporize, pass through the cell wall and thence through the inter-cellular spaces to the atmosphere surrounding the product. Thus, by holding the vacuum pressure at, e.g., 50 to 100 mm. of mercury for preferably 1 to 3 minutes after attaining a proper degree of dehydration, the moisture within the individual cell will progress into the intercellular space until it reaches an equilibrium point. After this equilibrium point has been reached, the whole foodstuff is approximately equally and uniformly dehydrated throughout its mass.

On the other hand, if the moisture between the cells is removed to a much greater extent than the moisture from inside the cell, the result is to freeze the full moisture inside the cell before it can get out. That cell is consequently expanding by the rapidly lowered temperature at the same time that moisture is being withdrawn from the lattice work between the cells. The lattice work thus becomes weakened and hence more susceptible to rupture.

It can thus be seen from the foregoing, as a fundamental concept of the invention, that foodstuffs which contain different animal and vegetable food products are to be individually cooked and then separately subjected to a vacuum of about 4.6 millimeters of mercury to reduce and remove water therefrom. It is essential to remove at least that amount of moisture that will create space for ice expansion within the individual cells and the pectin lattice joining them without rupture of the walls thereof, but not less than that moisture content which will prevent full recovery of the natural taste qualities of flavor, odor, and texture when reconstituted by rehydration.

The same invention also recognizes the combination of this vacuum dehydration procedure in conjunction with exterior air drying. In other words the product after the first vacuum cycle may be removed from the vacuum zone, air dried to its predetermined degree, replaced in the vacuum zone, reduced in temperature to 32° F. for a period of time sufficient to remove another equivalent of moisture and then finally frozen.

Of course other procedures may be utilized such as simply conventional air drying followed by conventional freezing, the air drying being conducted over a period of time sufficient to remove no more than that amount of moisture that will permit full reconstitution.

Once the desired amount of moisture is removed through subjection to vacuum of the order indicated, or by air drying, the given product is now in an ideal situation for fast freezing by any of several methods. It may be preferred to lower the vacuum to a more extreme level as for example to one or one-half mm. This extremely low vacuum will rapidly freeze and evaporate more of the contained moisture as freezing takes place. This, however, does not eliminate the possibility of freezing, after reaching the 32° F. level by application of low temperature by other media. Air blast freezing may be mentioned as an alterinate. In this instance such latter method works faster and better than where it is employed in known processes because the product has here been "precooled" to 32° F. Liquid nitrogen methods of freezing will also function ideally well for low temperature application after this initial vacuum step.

Optionally also, when referring to this more general method of dehydration, the operation set forth in my copending application, Ser. No. 88,455, "Process and Apparatus for Dehydration of Food Products," now Patent No. 3,137,546 may be used. The method and apparatus of the invention there disclosed involves the rotation of an annular zone containing the product with the dehydrating air admitted along the axis of rotation of such zone and emitted through the bed of product in the zone. The product rotates with the zone. However, at about the 1 o'clock position thereof the loose portion of the product drops from one side to the other. At this point a classifying medium is admitted longitudinally into the annular chamber. That portion of the product which has become dehydrated to a predetermined degree, and depending upon the force of the air jet, etc., becomes airborne and is discharged. The remaining product continues to rotate in the zone and loosely shift in this upper portion until each particle of the product is air dried in that equivalent amount to render it airborne, when it is discharged. By observing those variables of operation which may be readily recognized by those skilled in the art, any given product, by the use of this method, can be dehydrated with a great deal of accuracy down to any predetermined figure of moisture retention. Hence if it is desired to dehydrate peas to their optimum level (50%) or carrots (35%) the referred to mechanism and method ideally achieve this purpose.

The method of preparation first referred to above (dehydro-freeze cycle with alternate air dehydration steps) may be preferable in certain instances. Such is particularly true where the product is to be sold as, for example, a dehydro-frozen soup or stew. Here it is usually desired that the ingredients thereof be precooked so that upon consumption a minimum of time is needed for additional cooking, or at least heating to the preferred temperature. If precooking is desired each component is, in the preferred practice, cooked within about 2 minutes of being done, so that, for example, when prepared for use the mixture need be boiled only about 2 minutes. The result is that the mixed ingredients are at the very prime of their respective taste quality. Thus, if the mixture contains peas these may be precooked for about 7 minutes, carrots about 15 minutes, string beans about 18 minutes, mashed potatoes about 20 minutes, etc.

This precooking is particularly advantageous if such alternate vacuum freeze-heat dehydration of the products, as described in the identified disclosure, be employed. This is because as there set forth, the increased ingoing temperature of the product into the vacuum zone has a substantial effect upon the amount of dehydration that will occur during the vacuum cycle. This flows from the fact that a cooked product having a pulp temperature of 200° F. will have a great deal more available evaporative moisture (with consequently more heat lost) than a product entering the vacuum zone at a substantially lesser temperature. Hence precooking facilitates the rapidity of dehydration and effectiveness of the method described in detail in the referred to copending application.

The following are typical examples of the invention, it being understood that the latter is not confined thereto, for the claimed process is applicable to many different types of food products used in countless combinations and adaptable for use with respect to almost any vegetable or meat product.

EXAMPLE I

In this practice of the invention, approximately nine different food ingredients are intermixed to form a precooked, dehydro-frozen vegetable soup.

The following table indicates each of the ingredients of the composition and shows further the amount of dehydration accomplished with respect to each, as well as the time of cooking prior to dehydration.

With respect to the latter and as indicated above, cooking varies in total time between the several ingredients; in the present instance the cooking time of each product is such as to be within about 2 minutes of completion thereof. Of the following ingredients all are added (after dehydration) in equal amounts of 1 pound each except parsley and onion which are present in .1 pound and .25 pound quantities respectively.

TABLE

| Ingredient | Cooking Time, minutes | Percentage Dehydration* |
|---|---|---|
| Corn | 5 | 50 |
| Carrots | 15 | 35 |
| String Beans | 18 | 50 |
| Peas | 7 | 50 |
| Potatoes | 20 | 35 |
| Beef Stock (here containing small pieces of lesser grade beef and including seasoning) | 45 | 30 |
| Parsley (uncooked) | | 30 |
| Celery | 10 | 20 |
| Skinned Tomatoes | 12 | 30 |
| Onion | 15 | 8 |

*Retained moisture contained after treatment.

These several ingredients are separately cooked. They are also separately dehydrated by subjecting the same to a dehydro-freeze method wherein the original moisture content is reduced by at least 10% due to the imposition of vacuum, the respective product held at 4.6 mm. of vacuum to maintain it at 32° F. for at least 10 minutes; this is followed by lowering the vacuum to about .5 mm. to remove, in each instance, about 5% additional moisture with respect to each product.

The respective products are then separately withdrawn from the vacuum zone and subjected to air dehydration for a period of time sufficient to further dehydrate such products to within 5% of the final amount of dehydration desired.

Following this operation, each of the ingredients is separately subjected to vacuum dehydration with repetition of the cycle as set forth above—imposition of vacuum of an order of about 4.6 mm. of mercury, a wait period to permit at least an additional 5% of moisture to be withdrawn from said products, followed by lowering of vacuum to about .5 mm. of mercury pressure to obtain final freezing thereof.

After the final freeze step which again has been separately accomplished with respect to each ingredient, the frozen and different vegetable and meat products are intermixed in this state, packaged and stored in deep freeze storage maintained at a temperature of about −10° F.

The products are reconstituted in this admixed form as follows: to 1 quart of the frozen product is added 3 quarts of water. The product is maintained at the boiling point for a period of 3 minutes. As a result, the food mixture is completely thawed within about 1 minute and is then subjected to additional cooking for a period of about 2 minutes. At the end of this time each of the vegetable and meat substances of which the ultimate soup consists is fully hydrated, reconstituted and cooked, the beef stock and seasoning as well as the other ingredients thereof being completely admixed together. The taste of the product more nearly approximates the taste of a vegetable soup which has been prepared from untreated, fresh vegetables with the ingredients such as corn, carrots, beans, peas, etc., returning to their original shape and texture and exhibiting all the inherent qualities of the original fresh vegetables.

EXAMPLE II

In this example, a partially dehydrated beef stew is prepared in which all of the ingredients thereof are dehydrated to the extent indicated in the table set forth below. Dehydration, as before indicated, is to that extent with respect to a particular food ingredient which is as low as possible, consistent with proper subsequent reconstitution or hydration.

Each of the ingredients is again precooked to within 2 minutes of the full cooking time thereof. They are then dried through the use of alternate equipment referred to in the foregoing, i.e., the products are placed in the annular drying chamber of a concentric drum drier and there dried separately to predetermined degrees. The nature of the mechanism, as it is set forth in my Pat. No. 3,137,546, is such that upon any portion of the charge reaching a predetermined point of dehydration such portion of the product being treated becomes airborne and discharged. Control of the exact amount of dehydration is facilitated in this air drying type technique which is used in the example here given.

TABLE

| Food Products | Cooking Time, minutes | Amount of Dehydration, percent* |
|---|---|---|
| Diced Potatoes | 30 | 35 |
| Turnips | 45 | 30 |
| Carrots | 15 | 35 |
| Meat Stock | 45 | 30 |
| Onions (with seasoning added) | 20 | 5 |

*Amount of moisture retained in product.

After dehydration to the extent indicated, 4 pounds of diced potatoes, 1 pound each of turnips and carrots, 2 pounds diced meat and .25 pound of onions are admixed, together with proper seasoning, as the basic ingredients of the stew. After mixing, these are frozen by conventional quick freezing equipment. It will be observed that even if intermixed before freezing, removal of a substantial amount of moisture from each of the ingredients renders the individual particles thereof discrete and separate from each other. The result is that upon freezing the particles of the several mixed products remain separated, do not adhere together, nor freeze into a solid block.

The 8.25 pounds total of partially dehydrated ingredients are then reconstituted by placing the same in 3 quarts of hot water which is maintained at the boiling point for a period of about 3 minutes at the end of which time various components of the product are not only fully reconstituted but additionally cooked another 2 minutes— completing the final cooking thereof.

The dehydro-frozen product, thus reconstituted, duplicates to a substantial degree the characteristic taste, texture, etc., of the several involved foods, and otherwise more nearly approaches the taste of the same stew formulated from fresh meat and vegetables.

EXAMPLE III

In this example of the invention four different fresh vegetables are dehydro-frozen, to be consumed (after reconstitution and cooking) merely as a mixture of fresh vegetables.

In the present instance, the vegetables used are corn, carrots, beans and peas. These are dehydrated by a conventional air dehydration procedure to the extents indicated in the following table:

TABLE

| | Percent |
|---|---|
| Corn | 50 |
| Carrots | 35 |
| Lima beans | 28 |
| Peas | 50 |

After separate dehydration to these extents, the vegetables are mixed together in equal amounts of each and frozen by conventional flash freezing equipment. The vegetables are then packaged, stored in deep freeze storage maintained at a temperature of −10° F.

Upon thawing by immersion in warm water or merely by contacting air at ambient temperature, the vegetables are fully reconstituted by cooking over a usual period, with reconstitution taking place by following the procedure as it has been outlined in Examples I and II. The reconstituted vegetables exhibit all the natural qualities of the fresh product.

From the foregoing explanation of the invention, it will be appreciated that by separately dehydrating the various ingredients or various different vegetables to their own respective optimum level of weight reduction and then freezing and preserving the same in frozen form, it has been found possible to reconstitute the various ingredients back to a uniformly equal level which approximates the fresh product. In other words, in the examples given, a precooked type of meat might only be dehydrated to about 25% weight reduction, while in the same stew or soup a certain vegetable might be dehydrated to an 80% weight reduction level. Certain seasoning ingredients, such as onions, can be dehydrated to even greater extents, i.e., down to about 5% moisture retention in the product. Hence, there will be a range of over-all moisture retention in most vegetable and meat products of from about 5% to about 50% of the original moisture content. Generally speaking, weight of the frozen product is thus reduced to an average of from about 30% to 50% of the original weight, with a corresponding reduction in volume size. The frozen product thus represents a substantial reduction in packaging and handling costs while at the same time providing the consumer with a frozen food product which, when reconstituted, duplicates all the desirable characteristics of the fresh product.

I claim:

1. A dehydro-freezing method of preparing and reconstituting mixing foodstuffs containing different animal and vegetable food products which comprises: (a) separately precooking each of said products up to within about 2 minutes of the respective full cooking time thereof, (b) removing water therefrom to a moisture content between the lowest level of moisture retention permitting full recovery of the natural taste qualities of flavor, odor and texture of each one of said mixed foodstuffs when reconstituted by rehydration and that amount of moisture necessary to create space for ice expansion within the individual cells and intercellular pectin lattice structure without rupture of the walls thereof by subjecting each of said products to a vacuum of about 4.6 millimeters of mercury prior to freezing for a period of from 5 to 30 minutes, (c) separately freezing said products after step (b), (d) mixing said products in frozen condition, and (e) fully reconstituting said products by immersion in boiling water for a time sufficient to complete the cooking thereof.

2. The process as defined in claim 1 wherein said vacuum is maintained at said 4.6 millimeters of mercury for a period of time sufficient to remove about 10% of the moisture in said products.

3. A method of preserving mixed fruit, vegetable and meat products having cells and an intercellular pectin lattice work therein by dehydro freezing comprising, separately cooking each of said products up to within about 2 minutes of the respective completion times thereof, separately dehydrating each of said products by subjection thereof to a vacuum of the order of about 4.6 millimeters of mercury for a period of time sufficient to remove at least that amount of moisture that will create space for ice expansion within said individual cells and said intercellular pectin lattice work without rupture of the walls thereof but not more than that amount of moisture content which will prevent full recovery of the natural taste qualities of flavor, odor and texture of each one of said mixed fruit, vegetable and meat products upon reconstitution by rehydration, separately freezing said products and intermixing said products in frozen condition, whereby upon immersion in hot water each of said different food products reconstitutes and retains its natural taste qualities to an optimum degree.

4. The process of claim 3 further characterized in that the dehydrated food products are frozen by being subjected to a reduced pressure of 1 millimeter of mercury so as to cause freezing thereof.

5. The method of claim 3 further characterized in that said food products, after dehydration to the desired level, are subjected to a freezing condition by an air blast maintained at a temperature below the freezing point of said products.

6. A dehydro-freezing method of preparing and reconstituting mixed foodstuffs which contain different animal and vegetable food products in a manner as to prevent full reconstitution thereof which comprises: (a) separately precooking each of said products up to within about 2 minutes of the respective full cooking times thereof, separately dehydrating each of said products by subjection thereof to a vacuum of the order of about 4.6 millimeters of mercury to remove water therefrom to a moisture content between the lowest level of moisture retention permitting full recovery of the taste qualities of flavor, odor and texture of each one of said different animal and vegetable products when reconstituted by rehydration and that amount of moisture to create space for ice expansion within the individual cells and interstitial lattice structure without rupture of the walls thereof, raising the pressure exerted on said food products to from about 50 to 100 millimeters of mercury for from 1 to 3 minutes so as to attain vapor pressure equilibrium between the cells and intercellular lattice structure joining same, subjecting each of said products to a vacuum of about 1 millimeter of mercury to separately freeze each of the food products, (c) mixing said products in frozen condition, and (d) fully reconstituting said products by immersion in boiling water for a time sufficient to complete the cooking thereof.

7. A method of preserving vegetable and meat products having cells therein by dehydro-freezing comprising cooking each of said products up to within about 2 minutes of the respective completion times thereof, separately dehydrating each of said products by subjection thereof to a vacuum of the order of about 4.6 millimeters of mercury for a period of time sufficient to remove from about 50% to 95% of the original moisture content so as to create space for ice expansion within the individual cells and intercellular lattice joining same and to dehydrate each of said products to an optimum level for full reconstitution, thus to permit recovery of the original taste qualities of flavor, odor and texture when reconstituted by rehydration, separately freezing said products, and intermixing said products in frozen condition.

8. A method of preserving mixed fruit, vegetable and meat products having cells therein by dehydro-freezing comprising cooking each of said products up to within about 2 minutes of the respective completion time thereof, separately dehydrating each of said products by subjection thereof to a vacuum of the order of about 4.6 millimeters of mercury for a period of time sufficient to remove at least that amount of moisture that will create space for ice expansion within the individual cells without rupture of the walls thereof but not below that moisture content of each one of said mixed fruit, vegetable and meat products which will prevent full reconstitution thereof, separately freezing said products and intermixing said products in frozen condition, whereby upon immersion in hot water each of said different food products reconstitutes to an optimum degree.

9. The process as defined in claim 8 wherein said vacuum is maintained at said 4.6 millimeters of mercury for a period of time sufficient to remove about 10% of the moisture in said products.

10. A dehydro-freezing method of preparing and reconstituting mixed foodstuffs which contain different animal and vegetable food products in a manner as to permit full reconstitution thereof which comprises: (a) separately precooking each of said products up to within about 2 minutes of the respective full cooking times thereof, (b) removing water therefrom to a moisture content between the lowest level of moisture retention permitting recovery of the taste qualities of flavor, odor and texture of each one of said different animal and vegetable food products when reconstituted by rehydration thereof and that amount necessary to create space for ice expansion within the individual cells and intercellular pectin lattice structure without rupture of the walls thereof by subjecting each of said products to a vacuum of about 4.6 millimeters of mercury prior to freezing and for a period of time to remove about 10% of the moisture in each of said products, (c) separately freezing said products after step (b), mixing said products in frozen condition, and (e) fully reconstituting said products by immersion in boiling water for a time sufficient to complete the cooking thereof.

11. A method of preserving mixed fruit, vegetable and meat products having cells therein by dehydro-freezing comprising separately cooking each of said products up to within about 2 minutes of the respective completion times thereof, separately dehydrating each of said products to remove at least that amount of moisture which will create space for ice expansion within the individual cells and intercellular lattice network uniting same without rupture of the walls thereof, but no more than that amount of moisture which will prevent full recovery of the taste qualities of flavor, texture and odor for each one of said fruit, vegetable and meat products when reconstituted by rehydration, separately freezing said products and intermixing said products in frozen condition, whereby upon immersion in hot water each of said different food products reconstitutes to an optimum degree.

12. The method as defined in claim 11 wherein said separate dehydration of each of said products comprises vacuum dehydration.

13. The method as defined in claim 11 wherein the separate dehydration of each of said products comprises air dehydration.

References Cited

UNITED STATES PATENTS

| 3,219,463 | 11/1965 | Lamb | 99—199 |
| 3,219,462 | 11/1965 | Lamb | 99—199 |
| 3,219,461 | 11/1965 | Lamb | 99—199 |
| 3,218,725 | 11/1965 | Lamb | 99—199 |
| 2,844,476 | 7/1958 | Rivoche. | |
| 2,477,605 | 8/1949 | Howard. | |
| 2,278,472 | 4/1942 | Musher. | |

FOREIGN PATENTS 630,104      Canada.

A. LOUIS MONACELL, *Primary Examiner.*

M. VOET, *Assistant Examiner.*